United States Patent
Roskind et al.

(10) Patent No.: US 7,908,644 B2
(45) Date of Patent: *Mar. 15, 2011

(54) ADAPTIVE MULTI-TIER AUTHENTICATION SYSTEM

(75) Inventors: Jim Roskind, Redwood City, CA (US); Rory Ward, Sunnyvale, CA (US)

(73) Assignee: AOL Inc., Dulles, VA (US)

( * ) Notice: Subject to any disclaimer, the term of this patent is extended or adjusted under 35 U.S.C. 154(b) by 715 days.

This patent is subject to a terminal disclaimer.

(21) Appl. No.: 11/737,666

(22) Filed: Apr. 19, 2007

(65) Prior Publication Data

US 2007/0192588 A1 Aug. 16, 2007

Related U.S. Application Data

(63) Continuation of application No. 10/276,842, filed on Nov. 19, 2002, now Pat. No. 7,216,361.

(51) Int. Cl.
*H04L 9/00* (2006.01)
*H04L 9/32* (2006.01)

(52) U.S. Cl. .............. 726/3; 713/155; 705/66; 705/67

(58) Field of Classification Search ........................ None
See application file for complete search history.

(56) References Cited

U.S. PATENT DOCUMENTS

| | | | |
|---|---|---|---|
| 5,214,702 A | 5/1993 | Fischer | |
| 5,414,833 A | 5/1995 | Hershey et al. | |
| 5,684,951 A | 11/1997 | Goldman et al. | |
| 5,721,780 A | 2/1998 | Ensor et al. | |
| 5,751,812 A | 5/1998 | Anderson | |
| 5,751,814 A | 5/1998 | Kafri | |
| 5,825,880 A | 10/1998 | Sudia et al. | |

(Continued)

FOREIGN PATENT DOCUMENTS

EP 1197828 4/2002

(Continued)

OTHER PUBLICATIONS

Lunt, et al.; "Knowledge-Based Intrusion Detection"; Mar. 27-31, 1989; AI Systems in Government Conference, Proceedings of the Annual Washington DCpp. 102/107.

(Continued)

*Primary Examiner* — Kaveh Abrishamkar
(74) *Attorney, Agent, or Firm* — Michael A. Glenn; Glenn Patent Group

(57) ABSTRACT

An adaptive multi-tier authentication system provides secondary tiers of authentication which are used only when the user attempts a connection from a new environment. The invention accepts user input such as login attempts and responses to the system's questions. User login information such as IP address, originating phone number, or cookies on the user's machine are obtained for evaluation. User/usage profiles are kept for each user and the user login information is compared to the information from the user/usage profile for the specific user which contains all of the user information that the user used to establish the account and also the usage profile detailing the user's access patterns. The trust level of the current user login location is calculated and the invention determines if any additional questions to the user are required. If the trust level is high, then the user is granted access to the system. If the trust level is not high enough, then questions are sent to the user and the user's answers are evaluated and access is granted or denied based on the trust level and answers. The user's profile is updated to reflect the access attempt.

12 Claims, 3 Drawing Sheets

U.S. PATENT DOCUMENTS

| | | | |
|---|---|---|---|
| 5,850,443 | A | 12/1998 | Van Oorschot et al. |
| 5,875,296 | A | 2/1999 | Shi et al. |
| 5,892,900 | A | 4/1999 | Ginter et al. |
| 5,987,134 | A | 11/1999 | Shin et al. |
| 6,070,243 | A | 5/2000 | See et al. |
| 6,141,759 | A | 10/2000 | Braddy |
| 6,199,113 | B1 | 3/2001 | Alegre et al. |
| 6,205,479 | B1 | 3/2001 | Dulai et al. |
| 6,308,274 | B1 | 10/2001 | Swift |
| 6,327,652 | B1 | 12/2001 | England et al. |
| 6,334,121 | B1 | 12/2001 | Primeaux et al. |
| 6,343,280 | B2 | 1/2002 | Clark |
| 6,349,338 | B1 | 2/2002 | Seamons et al. |
| 6,351,817 | B1 | 2/2002 | Flyntz |
| 6,421,768 | B1 | 7/2002 | Purpura |
| 6,425,089 | B1 | 7/2002 | Tsai |
| 6,640,238 | B1 | 10/2003 | Bowman-Amuah |
| 6,658,091 | B1 | 12/2003 | Naidoo et al. |
| 6,668,322 | B1 | 12/2003 | Wood et al. |
| 6,691,232 | B1 * | 2/2004 | Wood et al. ............. 726/6 |
| 6,734,886 | B1 * | 5/2004 | Hagan et al. ............. 715/853 |
| 6,985,953 | B1 | 1/2006 | Sandhu et al. |
| 6,988,208 | B2 | 1/2006 | Hrabik et al. |
| 7,174,454 | B2 * | 2/2007 | Roskind ............. 713/155 |
| 2001/0034847 | A1 | 10/2001 | Gaul, Jr. |
| 2001/0056405 | A1 | 12/2001 | Muyres |
| 2002/0042884 | A1 | 4/2002 | Wu |
| 2003/0041141 | A1 | 2/2003 | Abdelaziz |
| 2004/0024851 | A1 | 2/2004 | Naidoo |
| 2004/0041910 | A1 | 3/2004 | Naidoo |
| 2004/0064568 | A1 | 4/2004 | Arora |
| 2004/0064693 | A1 | 4/2004 | Pabla |
| 2004/0086088 | A1 | 5/2004 | Naidoo |
| 2004/0086089 | A1 | 5/2004 | Naidoo |
| 2004/0086090 | A1 | 5/2004 | Naidoo |
| 2004/0086091 | A1 | 5/2004 | Naidoo |
| 2004/0088347 | A1 | 5/2004 | Yeager |
| 2004/0088369 | A1 | 5/2004 | Yeager |
| 2004/0093268 | A1 | 5/2004 | Ramchandani |
| 2004/0199770 | A1 | 10/2004 | Roskind |
| 2005/0132060 | A1 | 6/2005 | Mo |
| 2005/0187934 | A1 | 8/2005 | Motsinger |
| 2005/0188079 | A1 | 8/2005 | Motsinger |
| 2005/0188080 | A1 | 8/2005 | Motsinger |
| 2005/0188222 | A1 | 8/2005 | Motsinger |
| 2005/0188423 | A1 | 8/2005 | Motsinger |
| 2005/0198099 | A1 | 9/2005 | Motsinger |
| 2005/0203773 | A1 | 9/2005 | Soto |

FOREIGN PATENT DOCUMENTS

| | | |
|---|---|---|
| WO | WO 98/51029 A | 11/1998 |
| WO | WO 99/64967 | 12/1999 |
| WO | WO 99/65207 A | 12/1999 |
| WO | WO 00/07087 | 2/2000 |
| WO | WO 01/38999 | 5/2001 |
| WO | WO 01/73553 | 10/2001 |
| WO | WO 01/90859 | 11/2001 |
| WO | WO 02/32047 | 4/2002 |
| WO | WO 2004/044688 | 5/2004 |
| WO | WO 2004/114082 | 12/2004 |
| WO | WO 2005/060138 | 6/2005 |
| WO | WO 2005/069823 | 8/2005 |

OTHER PUBLICATIONS

Crosbie, et al.; "Active Defense of a Computer System using Autonomous Agents"; Feb. 15, 1995; Dept. of Computer Sciences, Purdue Univ., Technical Report No. 95-008.

Sequeira, et al.; "ADMIT: Anomaly-Based Data Mining for Intrusions";copyright 2002; Computer Science Dept., Rensselaer Polytechnic Institute.

Lane, et al.; "An Application of Machine Learning to Anomaly Detection"; Feb. 14, 1997; School of Electrical and Computer Engineering, Purdue Univ.

Abad, et al.: "Log Correlation for Intrusion Detection: Proof of Concept"; Dec. 2003; In Proc. Of the 19th Annual Computer Security Applications Conf. ACSAC 2003.

Endler, D.; "Intrusion Detection Applying Machine Learning to Solaris Audit Data"; Dec. 1998; Computer Security Applications Conf., Phoenix, AZ.

Gonzalez, L.; "Current Approaches to Detecting Intrusions"; 2002; Nova Southeastern Univ., Graduate School of Computer and Information Sciences.

Lane, et al.; "Detecting the Abnormal:Machine Learning in Computer Security"; Jan. 31, 1997; School of Electrical and Computer Engineering, Purdue Univ.

Smith, Sidney L.; "Authenticating Users by Word Association"; Dec. 1987; Computers & Security, vol. 6, No. 6 pp. 464-470.

Furui, Sadaoki; "Cepstral Analysis Technique for Automatic Speaker Verification"; Apr. 1981; IEEE Transactions on Acoustics, Speech and Signal Processing, vol. ASSP-29, No. 2, pp. 254-272.

Schalk, Thomas B.; "Speaker Verification Over the Telephone Network"; Feb./Mar. 1991; Speech Technology, pp. 32-35.

Willoughby, M.K.; *Automated User Authentication: The Final Frontier of Information Security*; 2001, retrieved on Jul. 22, 2009 from website: http://www.isaca.org/PrinterTemplate. . . ;Information Systems Control Journal, vol. 2.

*Traffic Considerations for Security Services in VoIP Systems*; W. Wimmreuter; Sixth Int'l Conf. on Intelligence in Networks: Telecommunication Network Intelligence; Sep. 2000.

*Access Control Meets Public Key Infrastructure, or: Assigning Roles to Strangers*; A. Herzberg; Y. Mass; J. Mihaeli; D. Naor; Y. Ravid; Proceeding 2000 IEEE Symposium on Security and Privacy; May 2000.

Merging and Extending the PGP and PEM Trust Models-The ICE-TEL Trust Model; D.W. Chadwick; A.J. Young; N.K. Cicovic; IEEE Network; May-Jun. 1997.

*BT Trustwise: Enabling eCommerce Through Trust: Electronic Commerce*; B.A. Cross; BT Technology Journal, vol. 17, No. 3, Jul. 1999.

*Building B2B Trust—Users are Turning to New Services to Make Sure They're Dealing with Trustworthy Businesses for Online Transactions*: Bob Violino; Computerworld; Jun. 17, 2002.

*Keys to the Privacy-Enabled Enterprise—Building Trust Across Computing Environments Requires a Combination of Firewalls, VPN's, SSL, PKI, Digital Certificates*; James R. Borck; InforWorld; Sep. 11, 2000.

*Multivendor PKI the Key to Smooth e-Business Communications—Certificate Authorities That Share User Information Speed Transactions and Increase Corporate Security*; Mandy Andress; InfoWorld; May 29, 2000.

*Sentry Builds Trust for e-Business—Public Key Infrastructure Product Greatly Reduces the Complexity and Cost of Ensuring Your Online Transactions*; Mandy Andress; InfoWorld; May 29, 2000.

*Pioneers . . . or Guinea Pigs?—Three Early Adopters Discuss the Pros and Cons of PKI Deployment*; Information Security; Jun. 1, 1999.

*Certifying Authorities Must Build Trust*; Jamie Lewis; PC Week; Jun. 29, 1998.

*The E-Signature Act Makes Online Transactions Legally Binding*; Sean Dorerty; Network Computing; Dec. 10, 2001.

*Going the Distance—As The Remote Workforce Grows, Network Access Must Be Made Safe and Sound*; George V. Hulme; Information Week; Nov. 26, 2001.

*Locking Down Web Services; If Web Services are the Future of Distributed Computing, You Need to Meet Their Considerable Security Challenges Head-On—and Sooner Rather than Later*; Roberta Bragg; Enterprise Systems Journal; Nov. 2001.

*IT Confidential*; John Soat; Information Week; Sep. 24, 2001.

*Pandora's Box or Panacea? (PKI)(Technology Information)*; Roberta Bragg; Enterprise Systems Journal; Sep. 2001.

*Trusted Third Parties Address Privacy—Management of Corporate Privacy Policies Spawns a New Software and Services Sector*; Karyl Scott; Information Week; Aug. 20, 2001.

*Pass the Cookies and Uphold the Privacy*; Kim Guenther; Computers in Libraries; Jun. 2001.

*The Burden of Proof*; Cam Johnston; Matthew Mancuso; Intelligent Enterprise; Feb. 2001.

*Small Firms can Succeed in the E-Business Game*; Paul McCarthy; Computer Weekly; Nov. 30, 2000.

*NGI on the Brain*; Ed Scannell; InfoWorld; Dec. 4, 2000.

*Partners Share Responsibility for Marketplace Security—B-TO-B Exchanges Must Establish Security Policies and Protocols that Everyone Agrees on*; Information Week; Nov. 20, 2000.
*Group Lays Foundation for Expanding PKI Use*; William Jackson; Government Computer News; Oct. 2, 2000.
*Designing Privacy for Your E-Business*; Peter Keen; PC Magazine; Jun. 6, 2000.
*Protect Customer's Web Privacy*; Dan Sullivan; E-Business Advisor; Apr. 2000.
*Digital Signatures*; Deborah Radcliff; Computerworld; Apr. 10, 2000.
*CyberTrust's Peter Hussey Thinks Identity is Key to Net-Based Communications*; Matthew Nelson; InfoWorld; Dec. 27, 1999.
*Entrust/PKI Secures E-Business*; James R. Borck; InfoWorld; Dec. 27, 1999.
*IT Gets Tools to Thwart Webjackers*; Ed Scannell; InfoWorld; Nov. 1, 1999.
*The State of Security 2000—Our Experts Give you the Skinny on Firewalls, VPN's, PKI, Antivirus Software, Vulnerability Monitoring and Intrusion Detection-The New Strategic Backbones to E-Commerce*; Network Computing; Oct. 4, 1999.

*Digital Cerficates are Moving Past the Pilot Phase*; Bill Roberts; Internet World; May 24, 1999.
*Auction Sites Seek Ways to Build Trust Between Buyers, Sellers*; Whit Andrews; Internet World; Oct. 5, 1998.
*Kerberos: A Secure Passport*; Joseph Salowey; UNIX Review's Performance Computing; Sep. 1998.
*Getting That Secure Feeling (RSA Data Security's Bsafe Toolkit is Used to Evaluate Security APIs)*; Tom Spitzer; Jun. 1998.
*Stamping Their Authority (Digital Certificates)*; David Bicknell; Computer Weekly; Jan. 29, 1998.
*Singapore—Netrust to Boost Secure Internet Commerce*; Newsbytes; Jul. 31, 1997.
*Beware the Backlash: Is the Web Risky Business*; Carol Levin; PC Magazine; Feb. 18, 1997.
*Holy Grail: Online Community*; Mitch Ratcliffe; Digital Media; Sep. 11, 1995.
*A Matter of Trust—Deploying a Public-Key Encryption System Extends Trust Across Boundraries*; Amy K. Larsen; InformationWeek; Mar. 15, 1999.

* cited by examiner

ADAPTIVE MULTI-TIER AUTHENTICATION SYSTEM

CROSS REFERENCE TO RELATED APPLICATION

This application is a continuation of U.S. patent application Ser. No. 10/276,842, filed Nov. 19, 2002, now U.S. Pat. No. 7,216,361, the entirety of which is incorporated herein by this reference thereto.

BACKGROUND OF THE INVENTION

1. Technical Field

The invention relates to user access in a computer environment. More particularly, the invention relates to adapting a secure user login from different originating clients in a computer environment.

2. Description of the Prior Art

Users commonly have their passwords compromised (lost or stolen). Attackers can typically use the stolen username/password to impersonate a user from a remote site. This compromises the service that the attackers infiltrate, which is costly to the service providers.

Most companies allow users access to an Intranet with very little authentication (i.e., a minor password). This is an extreme case where the company knows where the user is coming from; the access point of the user is in an expected area (e.g., inside the company building). When a user accesses a company's Intranet from an unexpected area (e.g., from home), users must use a secure ID (i.e. a major password) to access the first level.

Other mechanisms used to identify people such as biometrics (thumb prints, retinal scanners, etc.) are very expensive and hardware intensive. These type of approaches are difficult to install and use. They are also impractical when applied to the Internet.

The most common solution to avoiding vulnerability to password theft is to require that key material be carried to each authentication environment. Sometimes the key material is stored in a smart card, sometimes it is carried in a floppy (perhaps containing private keys). Either method is typically not user friendly and tend to suffer problems with the loss of the non-password material (or the user forgetting to carry the material).

It would be advantageous to provide an adaptive multi-tier authentication system that automatically adapts to the user's login patterns. It would further be advantageous to provide an adaptive multi-tier authentication system that does not require additional hardware from the service provider.

SUMMARY OF THE INVENTION

The invention provides an adaptive multi-tier authentication system. The system automatically adapts to the user's login patterns. In addition, the invention does not require additional hardware from the service provider by using a query-based security system.

A preferred embodiment of the invention provides secondary tiers of authentication which are used only when the user attempts a connection from a new environment. The invention accepts user input such as login attempts and responses to the system's questions.

User login information such as IP address, originating phone number, or cookies on the user's machine are obtained for evaluation. User/usage profiles are kept for each user.

The user login information is compared to the information from the user/usage profile for the specific user. The user/usage profile contains all of the user information that the user used to establish the account and also the usage profile detailing the user's access patterns.

The trust level of the current user login location is calculated and the invention determines if any additional questions to the user are required. If the trust level is high, then the user is granted access to the system. If the trust level is not high enough, then questions are sent to the user. The user's answers are evaluated and access is granted or denied based on the trust level and answers. The user's profile is updated to reflect the access attempt.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in an adaptive multi-tier authentication system in a computer environment. A system according to the invention automatically adapts to the user's login patterns. In addition, the invention provides a system that does not require additional hardware from the service provider by using a query-based security system.

Users commonly have their passwords compromised (lost or stolen). Attackers can typically use the stolen username/password to impersonate a user from a remote site. This compromises the service that the attackers infiltrate, which is costly to the service providers. The invention makes this type of impersonation more difficult by providing secondary tiers of authentication which are used ONLY when the user attempts a connection from a new environment (i.e., from a new computer, kiosk, etc.).

Figure 1:
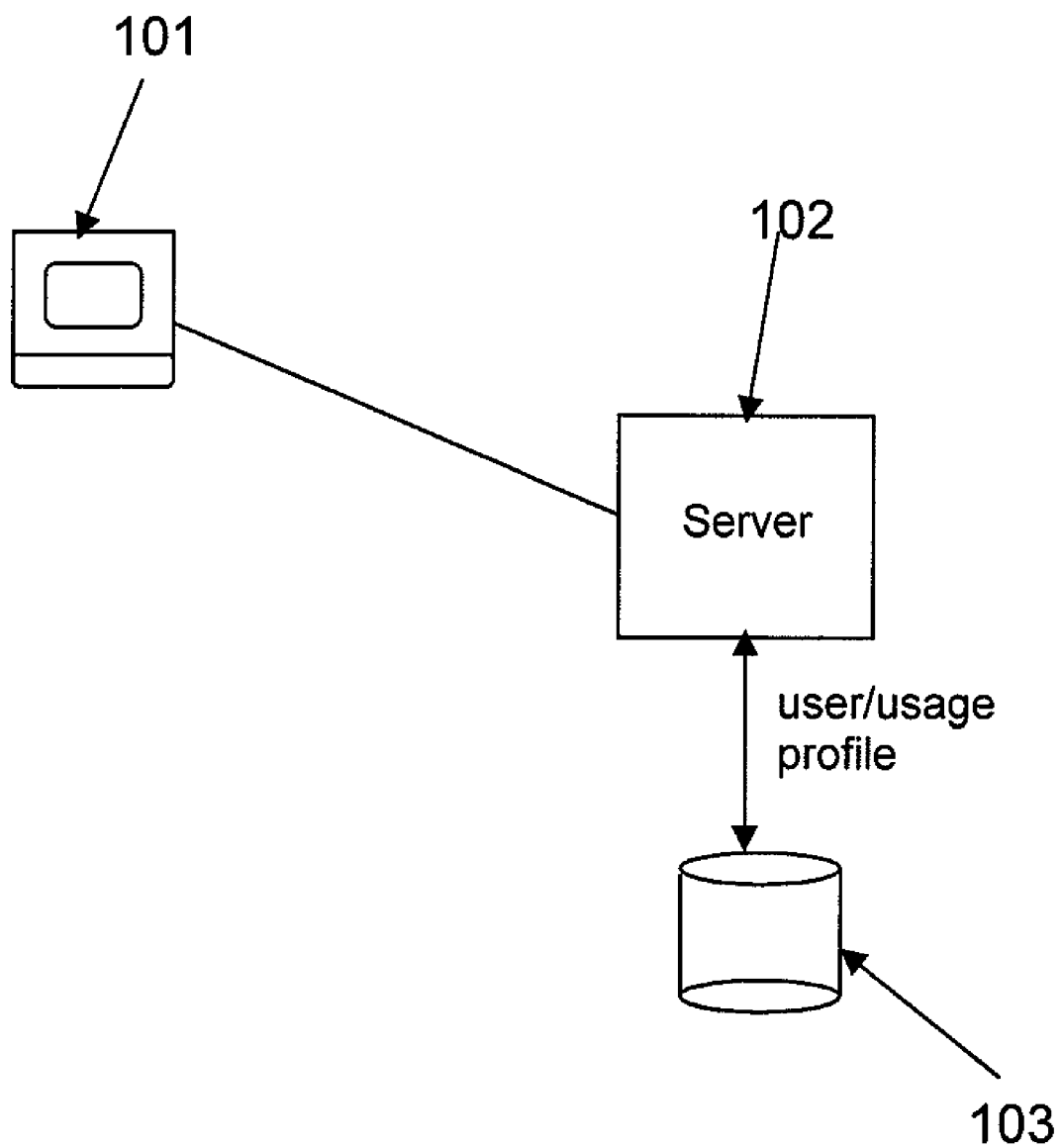
FIG. 1 is a block schematic diagram of a user remote access scenario according to the invention.

Referring to FIG. 1, a simple user interface scenario is shown. The user 101 logs onto the server 102. The server retrieves the user's stored use profile 103. The location where the user 101 is accessing the server is checked against the user's profile to determine a trust level for the session. The server 102 determines if any additional security measures must be taken based on the trust level.

A preferred embodiment of the invention analyzes the user's use of a service and typical access points to augment the trust level of each access point. If the user is always dialing in from home to access a service such as AOL, the invention observes the pattern and, after a while, determines that the trust level is high when the user accesses the service from home. At that point, the invention will allow immediate login into the service without asking for any additional information.

When the user suddenly goes travelling and accesses the service on the road, then the user's trust level is downgraded and more authentication questions are asked before allowing access. For example, the service may tell the user "We are surprised to see you dialing in from California. We just need to do a little extra background check on your identity. How many dogs did you tell us that you have? What are their names?"

Figure 2:
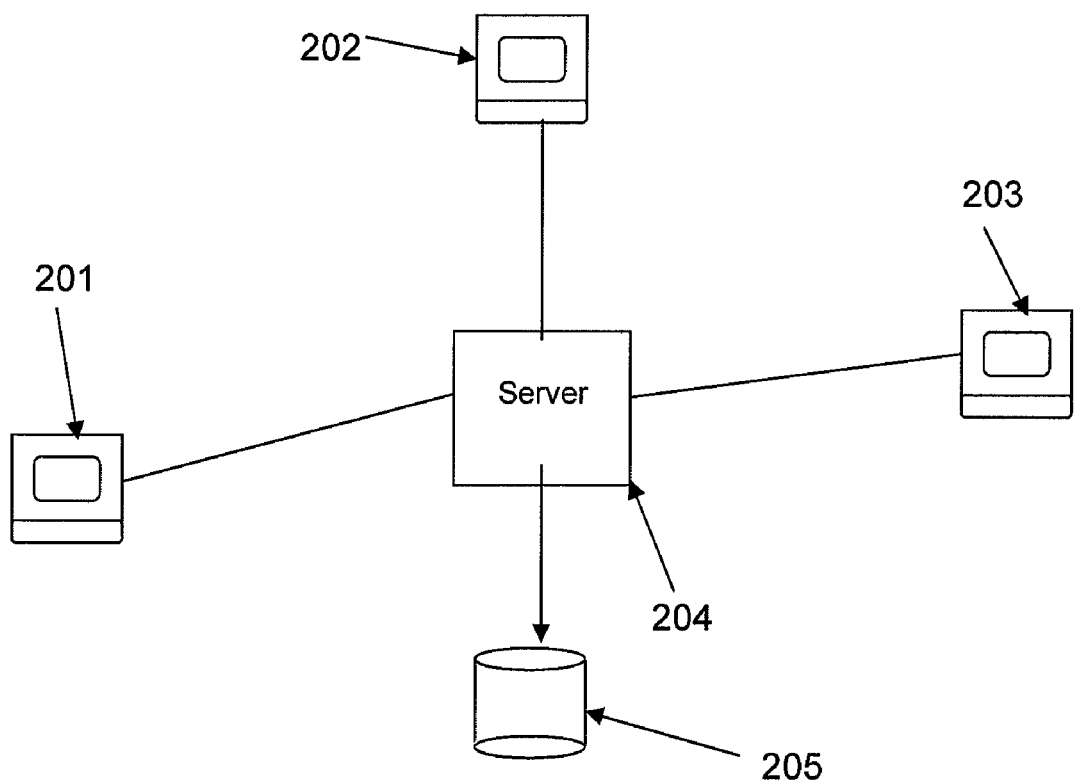
FIG. 2 is a block schematic diagram of a multiple access point example according to the invention.

With respect to FIG. 2, the user may be a salesperson and travels to different cities. This user's patterns may be random at best because his access points are all across the country 201, 202, 203. The server 204 takes this into account and determines that this is the user's normal pattern. The server 204 records this fact in the user's profile 205.

However, if the user logs in to the server 204 at one location 201 and then another user logs in using the same identity at another location 203, the server 204 will immediately downgrade the trust level of the second location and ask more authentication questions. This also applies to the situation when a user logs in the United States, for example, and a similar login occurs in Japan five hours later. The invention knows that the time frame is improbable.

The invention automates the process of tracking information such as IP addresses, where the user dialed in from, and the access times. A profile of the combination of data is used to as a basis to determine the level of trust. For example, the invention uses the following criteria to adapt authentication for a system:

Where the user is dialing in from (e.g., phone number).
Type of machine being used (e.g., Mac or PC).
Operating system on the machine.
Cookies/tags that are on the machine.
IP address (e.g., same IP address or same subnet).

When a user logs on, some distinct aspect of the computer is recorded. In the typical case, a random token is written into memory, or onto the disk of the client computer. Logon proceeds as usual ONLY if the existing token is located on the computer used for the login (e.g., an identifying cookie would be used on a per-computer basis for HTTP transactions). When the element that is used to identify the computer does not match the user's "standard list of computers used" then some secondary questions are asked as described above (e.g., "What is your birthday?", "What is your home phone number?") before completing the authentication.

The system adapts and learns new sites that the user logs in from, and then proceeds to use the minimal username/password from those sites only. Other techniques could be used to identify the logon environment as listed above (i.e., IP address or dial in line), but the creation of a unique mark (file, cookie, etc.) ensures verification of the environment.

The user is not burdened with having to carry anything with him that could to be lost or stolen (e.g., smart cards). This approach is analogous to traditional human identification systems, where, when the user is known, then additional proof of ID is not requested.

The user immediately knows when something is wrong when the invention suddenly asks for more information than usual. For example, if the user logs in from home, which is a normal situation, and the system asks for more information than normal, such as the user's dog's name. The unusual request would be an indicator to the user that something may be wrong, prompting the user to call into customer support to get more information.

Figure 3:
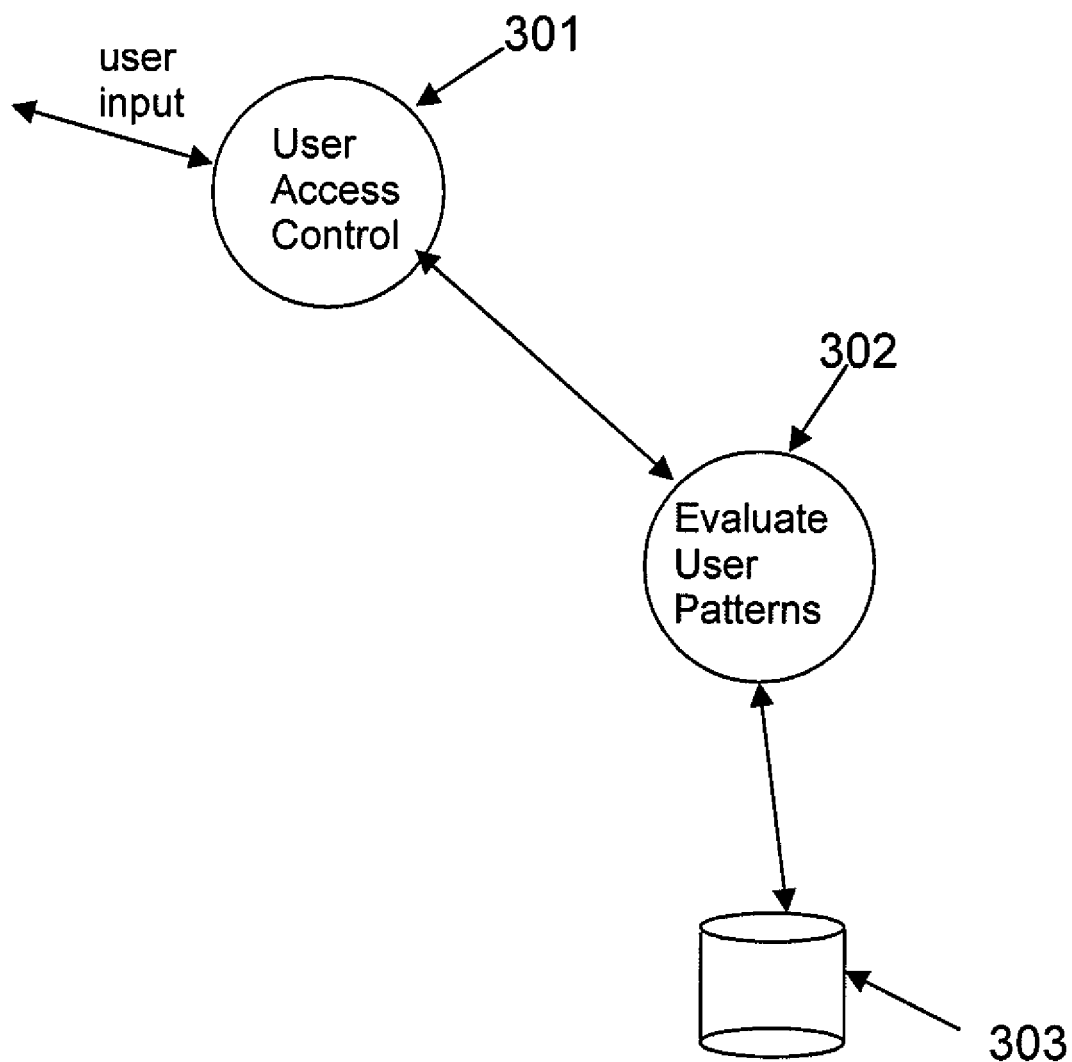
FIG. 3 is a block schematic diagram of a task viewpoint of the invention according to the invention.

Referring to FIG. 3, the User Access Control module 301 accepts user input such as login attempts and responses to the system's questions. The User Access Control module 301 has the responsibility to search and check for information such as IP address, originating phone number, or cookies on the user's machine. The Evaluate User Patterns module 302 takes the information obtained from the User Access Control module 301 and compares it to the usage information from the user/usage profile 303 for the specific user. The user/usage profile contains all of the user information that the user used to establish the account and also the usage profile detailing the user's access patterns.

The trust level of the current user login location is calculated and the Evaluate User Patterns module 302 determines if any additional questions to the user are required. Questions are sent through the User Access Control module 301 to the user. The user's answers are relayed from the User Access Control module 301 back to the Evaluate User Patterns module 302. The Evaluate User Patterns module 302 grants or denies access based on the trust level and answers for any questions that it asked. The Evaluate User Patterns module 302 updates the user/usage profile 303 for the user with the information just obtained.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for authenticating a user through an access device comprising the steps of:
   in association with a first authentication attempt by a user from a device to a server, requiring the user to provide additional authentication information beyond a lesser set of authentication information;
   authenticating the user based on the lesser set of authentication information and the additional authentication information;
   based at least on authenticating the user, storing on the server, in an inter-session user/usage profile for determining a trust level for a current authentication attempt, a distinct aspect of the device from which the user has authenticated and said user's access history, said access history comprising a user's standard list of computers used;
   in association with a second authentication attempt by the user from the device to the server, matching the distinct aspect of the device with the distinct aspect and access history stored on the server in association with the user; and
   based at least on the matching, authenticating the user based only on the lesser set of authentication information.

2. The method of claim 1, wherein the distinct aspect comprises a cookie.

3. The method of claim 1, wherein the distinct aspect comprises an IP address.

4. The method of claim 1, wherein the distinct aspect comprises a token.

5. The method of claim 1, wherein the distinct aspect comprises a file.

6. The method of claim 1, wherein the distinct aspect comprises where the user is dialing in from.

7. The method of claim 1, wherein the distinct aspect comprises the type of machine used.

8. The method of claim 1, wherein the distinct aspect comprises the type of operating system on the machine.

9. The method of claim 1, wherein said lesser set of authentication information comprises any of a username and a password.

10. The method of claim 1, wherein the additional login information comprises answers to security questions posed in addition to requesting username and password.

11. The method of claim 1, further comprising the steps of:
  storing on the server in association with the user times of authentication attempts previous to the first and second authentication attempts; and
  granting or denying access based, at least in part, on time elapsed between a previous authentication attempt and a current login attempt.

12. A computer-readable storage device encoded with instructions, which when loaded into a digital computational device executes the steps of a method for authenticating a user through an access device comprising the steps of:
  in association with a first authentication attempt by a user from a device to a server, requiring the user to provide additional authentication information beyond a lesser set of authentication information;
  authenticating the user based on the lesser set of authentication information and the additional authentication information;
  based at least on authenticating the user, storing on the server, in an inter-session user/usage profile for determining a trust level for a current authentication attempt, a distinct aspect of the device from which the user has authenticated and said users access history, said access history comprising a user's standard list of computers used;
  in association with a second authentication attempt by the user from the device to the server, matching the distinct aspect of the device with the distinct aspect and access history stored on the server in association with the user; and
  based at least on the matching, authenticating the user based only on the lesser set of authentication information.

* * * * *